(12) United States Patent
Goikhman

(10) Patent No.: US 9,075,654 B1
(45) Date of Patent: Jul. 7, 2015

(54) METHOD AND APPARATUS FOR CONSTRAINT PROGRAMMING OF RESOURCES

(71) Applicant: Shay Goikhman, Haifa (IL)

(72) Inventor: Shay Goikhman, Haifa (IL)

(73) Assignee: MARVELL ISRAEL (M. I. S. L.) LTD., Yokneam (IL)

( * ) Notice: Subject to any disclaimer, the term of this patent is extended or adjusted under 35 U.S.C. 154(b) by 307 days.

(21) Appl. No.: 13/666,020

(22) Filed: Nov. 1, 2012

Related U.S. Application Data

(60) Provisional application No. 61/554,892, filed on Nov. 2, 2011.

(51) Int. Cl.
G06F 9/46 (2006.01)
G06F 9/50 (2006.01)

(52) U.S. Cl.
CPC .......................................... *G06F 9/50* (2013.01)

(58) Field of Classification Search
None
See application file for complete search history.

(56) References Cited

U.S. PATENT DOCUMENTS

| | | | | |
|---|---|---|---|---|
| 5,787,266 | A * | 7/1998 | Johnson et al. | 712/216 |
| 6,125,394 | A * | 9/2000 | Rabinovich | 709/226 |
| 7,150,021 | B1* | 12/2006 | Vajjhala et al. | 718/104 |
| 8,078,664 | B2* | 12/2011 | Radia et al. | 709/201 |
| 8,082,549 | B2* | 12/2011 | Corley et al. | 718/104 |
| 8,359,599 | B2* | 1/2013 | Coulter et al. | 718/104 |
| 2002/0038329 | A1* | 3/2002 | Lenormand et al. | 709/104 |
| 2005/0257085 | A1* | 11/2005 | Haustein et al. | 714/13 |
| 2006/0069780 | A1* | 3/2006 | Batni et al. | 709/226 |
| 2006/0236368 | A1* | 10/2006 | Raja et al. | 726/1 |
| 2009/0307663 | A1* | 12/2009 | Maybee et al. | 717/124 |
| 2014/0019987 | A1* | 1/2014 | Verma et al. | 718/103 |

* cited by examiner

*Primary Examiner* — Kenneth Tang

(57) ABSTRACT

Systems and methods are provided for performing tasks in a machine having constrained resources for performing the tasks. A map is generated between desired tasks to be performed and resources of the machine that can be used to perform the desired tasks. The resources are sorted based on a number of the desired tasks that can be performed by each resource using the map. A first task to be performed is selected by the machine, and a first resource of the machine is selected to perform the selected first task based on the sorted order of the resources. The machine performs the selected first task using the selected first resource.

18 Claims, 5 Drawing Sheets

FIG. 3
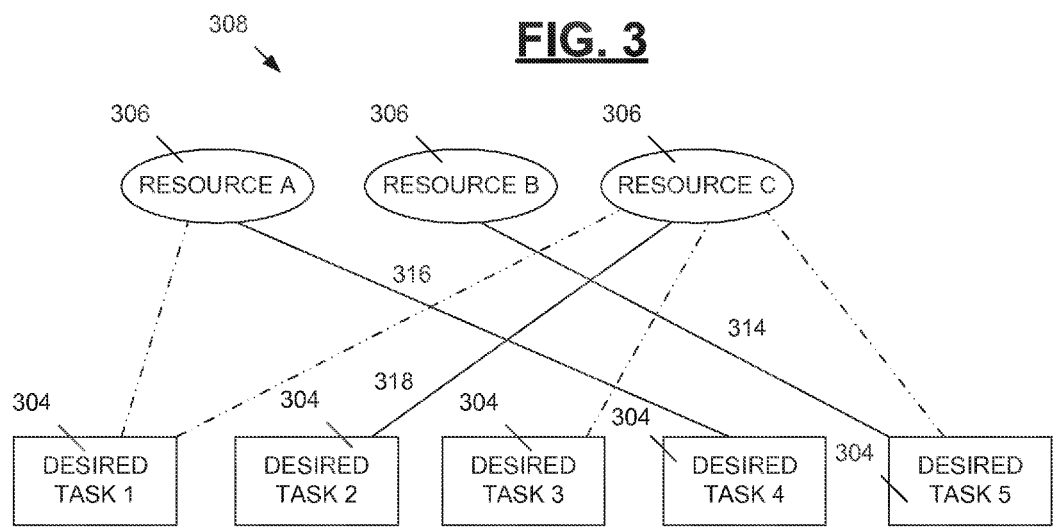
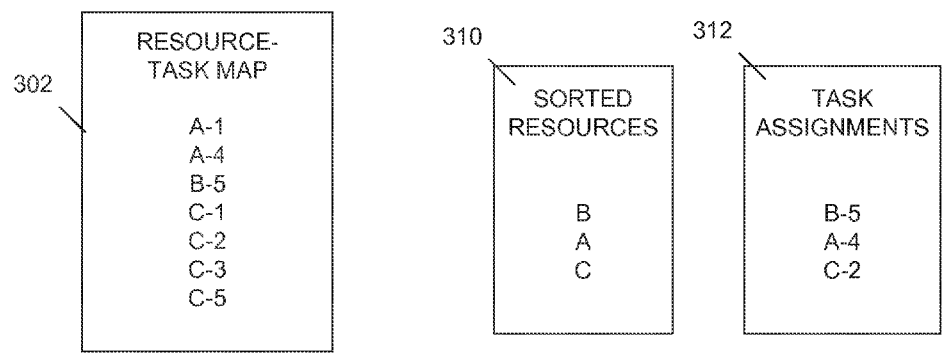

METHOD AND APPARATUS FOR CONSTRAINT PROGRAMMING OF RESOURCES

CROSS-REFERENCE TO RELATED APPLICATIONS

This application claims priority to U.S. Provisional Patent Application No. 61/554,892, filed Nov. 2, 2011, entitled "Constraint Programming of Resources from Alternatives," which is herein incorporated by reference in its entirety.

FIELD

The technology described herein relates generally to resource assignment and more particularly to resource assignment in a constrained resource environment.

BACKGROUND

The resources available to perform certain desired tasks in a computing system are often limited. In some situations, a failure to successfully match a desired task to a resource needed to perform that task may result in the inability to complete the desired task. In other situations, such limits may reduce throughput of completion of the desired tasks by the computing system, where desired tasks are placed in queues for access to resources necessary to perform those tasks.

The description above is presented as a general overview of related art in this field and should not be construed as an admission that any of the information it contains constitutes prior art against the present patent application.

SUMMARY

Examples of systems and methods are provided for performing tasks in a machine having constrained resources for performing the tasks. A map is generated between desired tasks to be performed and resources of the machine that can be used to perform the desired tasks. The resources are sorted based on a number of the desired tasks that can be performed by each resource using the map. A first task to be performed is selected by the machine, and a first resource of the machine is selected to perform the selected first task based on the sorted order of the resources. The machine performs the selected first task using the selected first resource.

As another example, a computer-implemented system that is configured to perform tasks includes a plurality of resources, where each of the resources is configured to perform one or more types of tasks. One or more computer-readable mediums are encoded with a task data structure that includes indications of desired tasks to be performed and a resource-task map data structure that associates the desired tasks with resources of the plurality of resources that can perform the desired tasks. A data processing unit is configured to determine a count of the number of desired tasks associated with each of the resources using the resource-task map data structure and assign desired tasks to the resources based on the determined counts.

BRIEF DESCRIPTION OF THE DRAWINGS

FIG. 3 is a diagram depicting task assignment in a system having fewer available resources than desired tasks in an embodiment of the disclosure.

DETAILED DESCRIPTION

Figure 1:
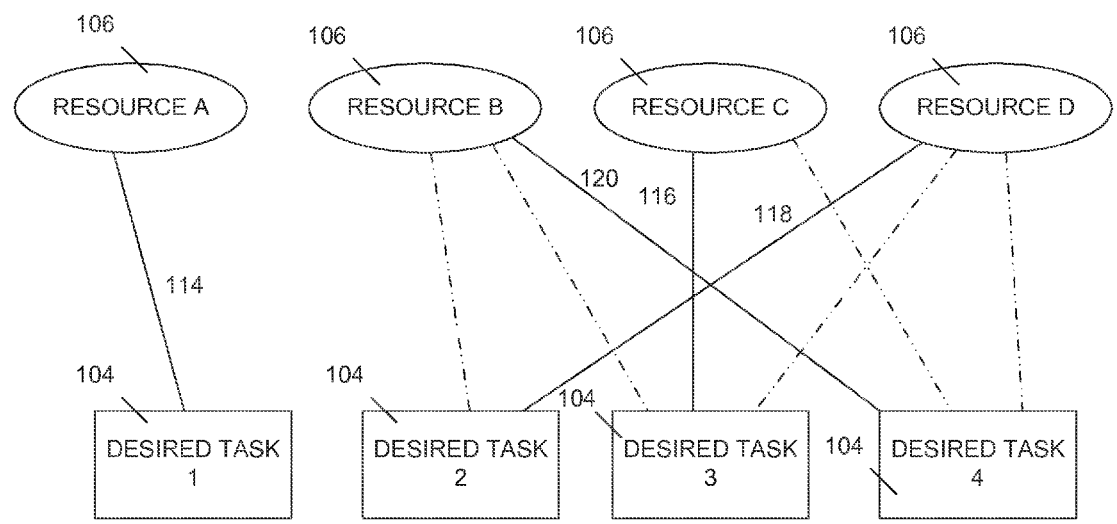
FIG. 1 is a diagram depicting performance of tasks in a machine having constrained resources for performing tasks in accordance with an embodiment of the disclosure.

FIG. 1 is a diagram depicting performance of tasks in a machine having constrained resources for performing the tasks in accordance with an embodiment of the disclosure. A map 102 is generated between desired tasks to be performed 104 and resources 106 of the machine that can be used to perform the desired tasks 104. A graphical depiction of that map 102 is depicted at 107, where dashed lines indicate associations between desired tasks and resources that can be used to perform those desired tasks, and solid lines indicate desired tasks that have been assigned to resources. The resources 106 are sorted at 108 based on the number of the desired tasks 104 that can be performed by each resource 106 using the map 102. At 110, a first task (Desired Task 1) is selected to be performed by the machine, and a first resource (Resource A) is selected based on the sorted order 108 of the resources. The machine then performs the selected first task using the selected first resource.

The desired tasks 104 are assigned to the resources 106, in an embodiment, according to a number of protocols. In one example, the resource-task map 102 is generated that includes a link between each task and each of the resources that are capable of performing that task.

To sort the resources to generate the sorted resources list 108, a determination is made, for each resource, of the count of links from a desired task to that resource. The resources are then sorted based on the determined number of links from least to greatest. In the example of FIG. 1, Resource A has one link, Resource B has 3 links, Resource C has two links, and Resource D has 3 links. Thus, the sorted resource list depicted at 108 contains Resource A, Resource C, Resource B, and Resource D, respectively.

Desired tasks 104 are assigned to resources 106 based on the sorted resource list 108. In one example, a first resource (Resource A) is selected based on that resource having the smallest count of links (i.e., the resource 106 at the top of the sorted resource list 108). Having selected Resource A as the first resource, the resource-task map 102 is referenced to identify a task that can be assigned to the selected resource. In the example of FIG. 1, Desired Task 1 is the only task that is linked to Resource A. Thus, in the illustrated embodiment, Desired Task 1 is assigned to Resource A, as indicated at 114. Desired Task 1 may then be indicated at having been assigned and Resource A may be indicated as being occupied (e.g., on the resource-task map 102), preventing improper duplication of assignments.

The next resource (Resource C) on the sorted resource list 108 is then selected. Resource C is identified as being capable of performing two tasks, namely Desired Task 3 and Desired Task 4. Neither of Desired Task 3 and Desired Task 4 have been previously assigned. A decision between assigning Desired Task 3 or Desired Task 4 to Resource C can be made on a variety of bases. In an embodiment, such a decision between two tasks is based on a unique task mapping check. The unique task mapping check determines, for a resource currently being considered, whether a particular one of the desired tasks can only be performed by that resource being considered. In that case, the particular desired task is given priority over the other desired tasks that the resource being considered is identified as being capable of performing. A first example of a unique task mapping is shown in FIG. 1 for Desired Task 1, where Desired Task 1 can only be performed by Resource A. Because only Desired Task 1 is assigned to Resource A, granting priority to Desired Task 1 for Resource A does not affect the result. Additional examples of handling of unique task mappings are described in detail below.

In the example of FIG. 1, Desired Task 3 is arbitrarily selected over Desired Task 4 for assignment to Resource C, as indicated at 116. Neither of Desired Task 3 or Desired Task 4 are uniquely mapped to Resource C at this point in the assignment process, so a unique mapping check would not affect this decision. Resource B is next on the sorted resource list 108, having three associated desired tasks, with Desired Task 2 and Desired Task 4 remaining unassigned. In the example of FIG. 1, of the two unassigned desired tasks associated with Resource B, Desired Task 4 is arbitrarily assigned to Resource B, as indicated at 118. Neither of Desired Task 2 or Desired Task 4 are uniquely mapped to Resource B at this point in the assignment process, so a unique mapping check would not affect this decision. Resource D is last on the sorted resource list 108. Resource D is capable of performing Desired Task 2, Desired Task 3, and Desired Task 4. Desired Task 2 is the only one of those tasks that remains unassigned. Thus, Desired Task 2 is assigned to Resource D, as indicated at 120.

Figure 2:
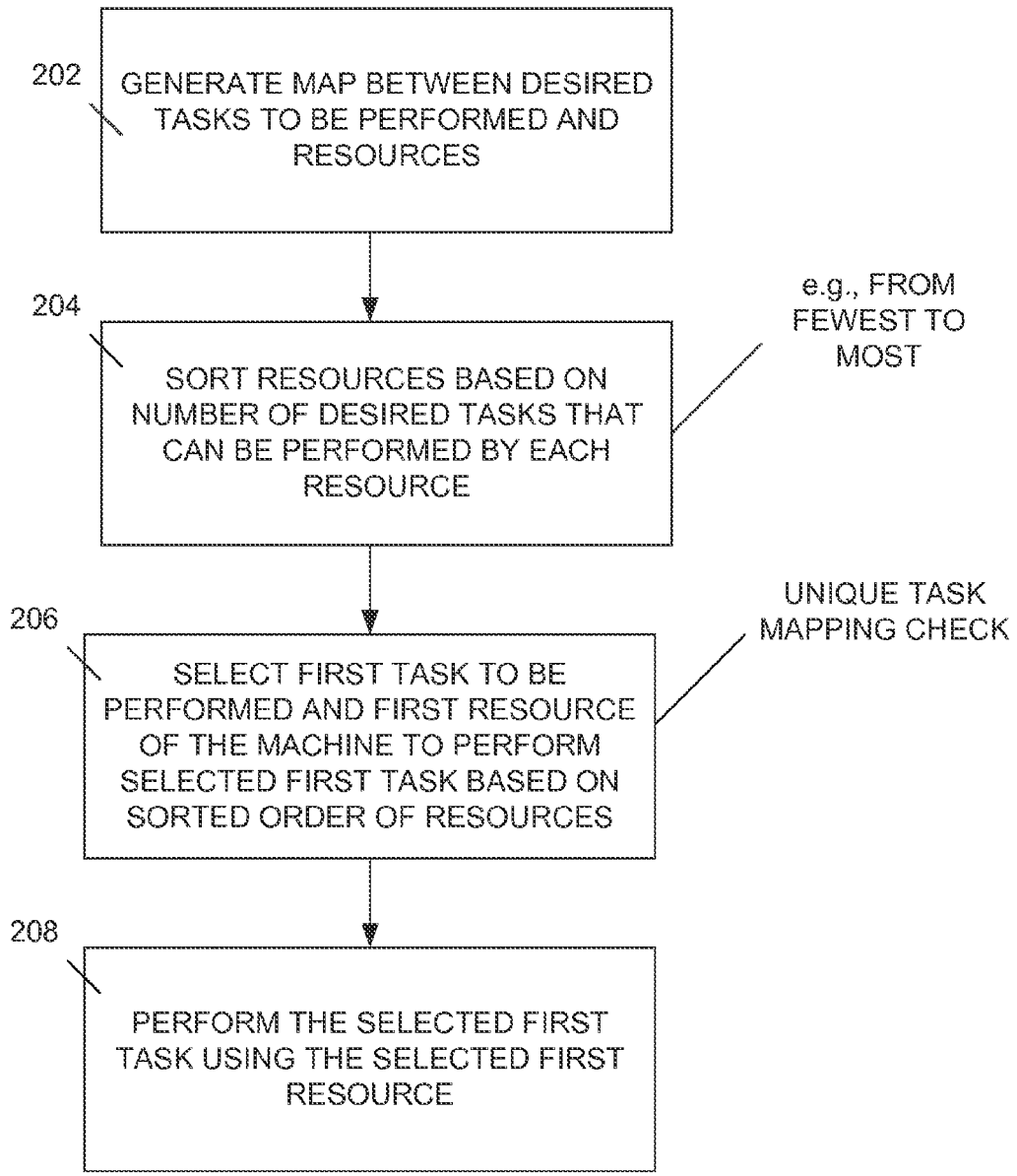
FIG. 2 is a flow diagram depicting a method of performing tasks in a machine having constrained resources for performing the tasks in an embodiment of the disclosure.

FIG. 2 is a flow diagram depicting a method of performing tasks in a machine having constrained resources for performing the tasks in an embodiment of the disclosure. At 202, a map is generated between desired tasks to be performed and resources of the machine that can be used to perform the tasks. At 204, the resources are sorted based on a number of the desired tasks that can be performed by each resource using the map. At 206, a first task to be performed is selected by the machine, and a first resource of the machine to perform the selected first task is selected based on the sorted order of the resources. At 208, the selected first task is performed by the machine using the selected first resource.

The process depicted in FIG. 2 may be utilized in a variety of contexts. In an embodiment of the disclosure, the process of FIG. 2 is implemented in a computer system having limited resources. In other words, there are insufficient resources in the computer system to perform, at any given time, all of the tasks that need to be performed at that time. Certain of those limited resources may be specialized resources that are designed to perform specialized tasks. Certain of the resources may be capable of performing certain types of tasks but not other types of tasks. The computer system tracks the resources available and the types of tasks that those resources are capable of performing. The computer system further identifies a set of desired tasks that are to be performed. The computer system then assigns the desired tasks to the available resources according to a heuristic that assigns the tasks in a near-optimum fashion that can offer improved performance over a system that implements a comprehensive task/resource search and assignment protocol.

The improved performance that can be accomplished can be useful in a variety of implementations. For example, in an implementation where task-to-resource assignments are being made in real time, a comprehensive task/resource search and assignment protocol that identifies all possible task-resource combinations and evaluates and implements all identified constraints in generating an optimum task-to-resource assignment plan may not be capable of operating within the time limits required of such a real-time operating environment. In contrast, a system utilizing the heuristic depicted in FIG. 2 may be able to operate within such time constraints.

In an embodiment of the disclosure, a computing machine has a set of desired tasks (operations) to be performed as well as a set of special-purpose programming resources that are available for use by the tasks. In this example, each special-purpose programming resource may be assigned only once. A desired task is assigned by selecting a specific resource from the set of special purpose programming resources to perform the desired task. Given the set of desired tasks and the set of special-purpose programming resources that are available for use by the tasks, the machine seeks to perform the task-to-resource assignment using a heuristic. In one example, a generated map between desired tasks and special-purpose registers, each of which is capable of performing at least some of those tasks is as follows:

| Desired Task | Capable Register |
|---|---|
| b_acc | C3 |
| d_rcnt | C0 |
| d_rcnt | C1 |
| wb_beat | C1 |
| wb_beat | C2 |
| dc_rmiss | C0 |
| dc_rmiss | C1 |
| dc_rmiss | C3 |

In this example, a sorted resource list would contain Register C2 (1 desired tasks), Register C3 (2 desired tasks), Register C0 (2 desired tasks), and Register C1(3 desired tasks). Register C2, at the front of the list, is assigned task wb_beat, the only task that is associated with Register C2. In other words, Register C2 is the first register assigned a task, and Register C2 is assigned the only of the desired tasks that Register C2 is capable of performing. Next, the machine must select between task b_acc and dc_rmiss for Register C3, the second resource on the sorted resource list. In some embodiments, the machine arbitrarily selects between b_acc and dc_rmiss. However, in other embodiments, a unique task mapping check is implemented in an attempt to improve assignment heuristic performance. In selecting between multiple alternative tasks to assign to a currently considered resource, the unique task mapping checks to see if the currently considered resource is the only (or only remaining) resource that can perform the task. In the current example, such a check discovers that Register C3 is the only task that can perform the task b_acc. Thus, the task b_acc is given priority over task dc_rmiss, which could still be performed by Register C0 or Register C1, and task b_ace is assigned to Register C3.

Next, the machine must select between task d_rcnt and task dc_rmiss for Register C0, the third resource on the sorted resource list. A unique task mapping check reveals that both of task d_rcnt and task dc_rmiss have multiple unassigned registers remaining that are capable of performing their tasks. In this example, Register C0 is assigned the dc_rmiss task. Finally, task d_rcnt is assigned to Register C1, the last resource on the sorted resource list.

The types of tasks that may be assigned to resources may take a wide variety of forms. In an embodiment of the disclosure, the desired tasks are tasks that track certain software or hardware debugging metrics. In that example, the resources to which the desired tasks are assigned take the form of registers or memory locations that are configured to track one or more types of debugging metrics, each. For example, each of the registers or memory locations (e.g., memory locations in a content addressable memory) may be configured to track one or more of a set of debugging metrics that include: a processor cycle count, a cache miss count, a completed instructions count, a stall condition count, an access clash count, and a power dissipation metric.

FIG. 3 is a diagram depicting task assignment in a system having fewer available resources than desired tasks in an embodiment of the disclosure. In FIG. 3, a resource-task map 302 is generated containing mappings between desired tasks 304 to be performed and resources 306 of a machine that can be used to perform the desired tasks. A graphical visualization of the resource-task map 302 is depicted at 308. The resources 306 are sorted based on a number of the desired tasks 304 that can be performed by each resource 306 using the map 302 to generate a sorted resource list 310. In the example of FIG. 3, the resources 306 are sorted from least desired task links to most desired task links. As indicated in the resource-task map, Resource B has the fewest links (1), Resource A has the second fewest links (2), and Resource C has the most links (4).

A first resource is selected based on the sorted order 310 of the resources 306. Based on its first position in the sorted queue of resources, Resource B is selected first because Resource B is capable of performing the fewest number of tasks. As seen in FIG. 3, Resource B is linked to by a single desired task, Desired Task 5. Thus, Desired Task 5 is selected as the first desired task to be performed by the machine using the first resource, Resource B. That task assignment is indicated in a task assignment list 312 and depicted with a solid line at 314. Resource B is indicated as busy, and Desired Task 5 is indicated as having been assigned, to prevent improper multiple assignments.

A second resource is selected based on the sorted order 310 of the resources 306. Based on its second position in the sorted queue of resources, Resource A is selected second. Resource A is linked to by two desired tasks, Desired Task 1 and Desired Task 2. In some implementations, a machine selects to assign either Desired Task 1 or Desired Task 2 based on some arbitrary basis (e.g., randomly, based on a task index value), on a rule (e.g., first-in-first-assigned, last-in-last-assigned), or other suitable basis. In the example of FIG. 3, desired tasks are assigned arbitrarily following a unique task mapping check. Desired Task 1 is linked to Resource A and Resource C, both of which remain available. Thus, Desired Task 1 is not uniquely mapped to Resource A. Desired Task 4 is only linked to Resource A. Thus, Desired Task 4 is uniquely mapped to Resource A. If Desired Task 4 were not assigned to Resource A, Desired Task 4 could not be later assigned to another resource 306 without waiting. Thus, the unique task mapping check selects Desired Task 4 to be performed by Resource A, as shown in the task assignment list 312 and indicated at 316. Resource A is identified as busy, and Desired Task 4 is indicated as assigned, such as in the resource task map 302, so as to prevent improper multiple assignments.

A third resource, Resource C, is selected based on its last position in the sorted resource list 310. Resource C is linked to four tasks, Desired Task 1, Desired Task 2, Desired Task 3, and Desired Task 5. Based on indications of a prior assignment of Desired Task 5, only Desired Task 1, Desired Task 2, and Desired Task 3 are considered for assignment to Resource C. A unique task mapping check is performed. Each of Desired Task 1, Desired Task 2, and Desired Task 3 are uniquely mapped to Resource C, as Resource C is the only unassigned resource 306 remaining. In the present embodiment of the unique task mapping check, Desired Task 2 and Desired Task 3 are given priority over Desired Task 1 based on their absolute unique link to Resource C (i.e., Desired Task 1 is also linked to Resource A, which could come available, giving Desired Task 1 another path to assignment). The machine arbitrarily (e.g., randomly) selects between Desired Task 2 and Desired Task 3, which have same levels of priority based on the unique task mapping check, selecting Desired Task 2 for assignment to Resource C, as indicated with a solid line at 318.

The unassigned tasks, Desired Task 1 and Desired Task 3 may be treated in a variety of ways. In one example, the unassigned tasks are queued for execution once one of their competent resources is freed. In another example, the unassigned task may be rejected as not able to be completed, such as via an exception.

Figure 4:
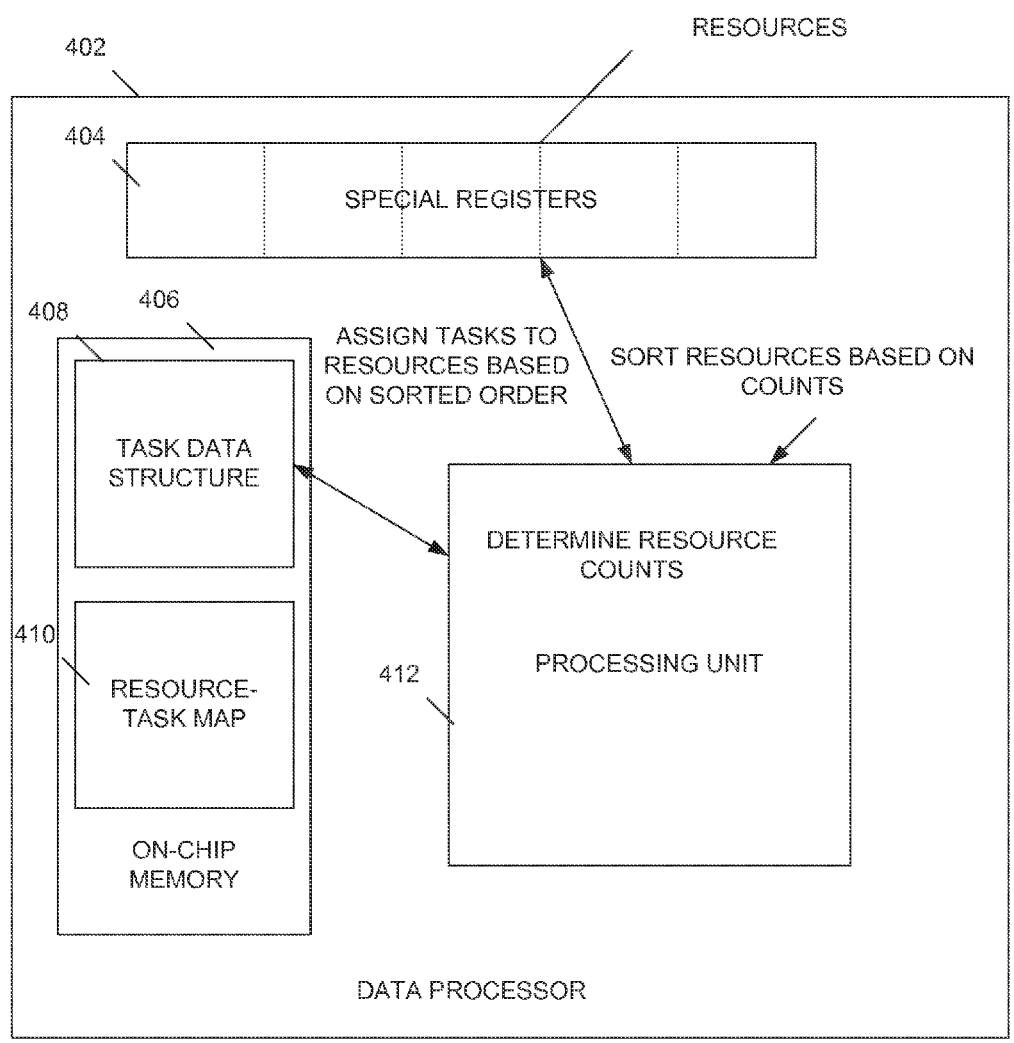
FIG. 4 is a block diagram depicting an on-chip computer-implemented system that is configured to perform tasks in accordance with an embodiment of the disclosure.

FIG. 4 is a block diagram depicting an on-chip computer-implemented system that is configured to perform tasks in accordance with an embodiment of the disclosure. The system 402, embodied on a data processor, includes a plurality of resources, in the form of special registers 404, which are each configured to perform one or more types of tasks. The system 402 further includes one or more computer-readable mediums in the form of on-chip memory 406. The on-chip memory 406 is encoded with a task data structure 408 that includes indications of desired tasks to be performed. The on-chip memory 406 is further encoded with a resource-task map data structure 410 that associates the desired tasks with special registers 404 that can perform the desired tasks. The system 402 further includes a data processing unit 412. The data processing unit 412 is configured to determine a count of the number of desired tasks associated with each of the special registers 404 using the resource-task map data structure 41. The data processing unit 412 is further configured to assign desired tasks to the special registers 404 based on the determined counts.

Figure 5:
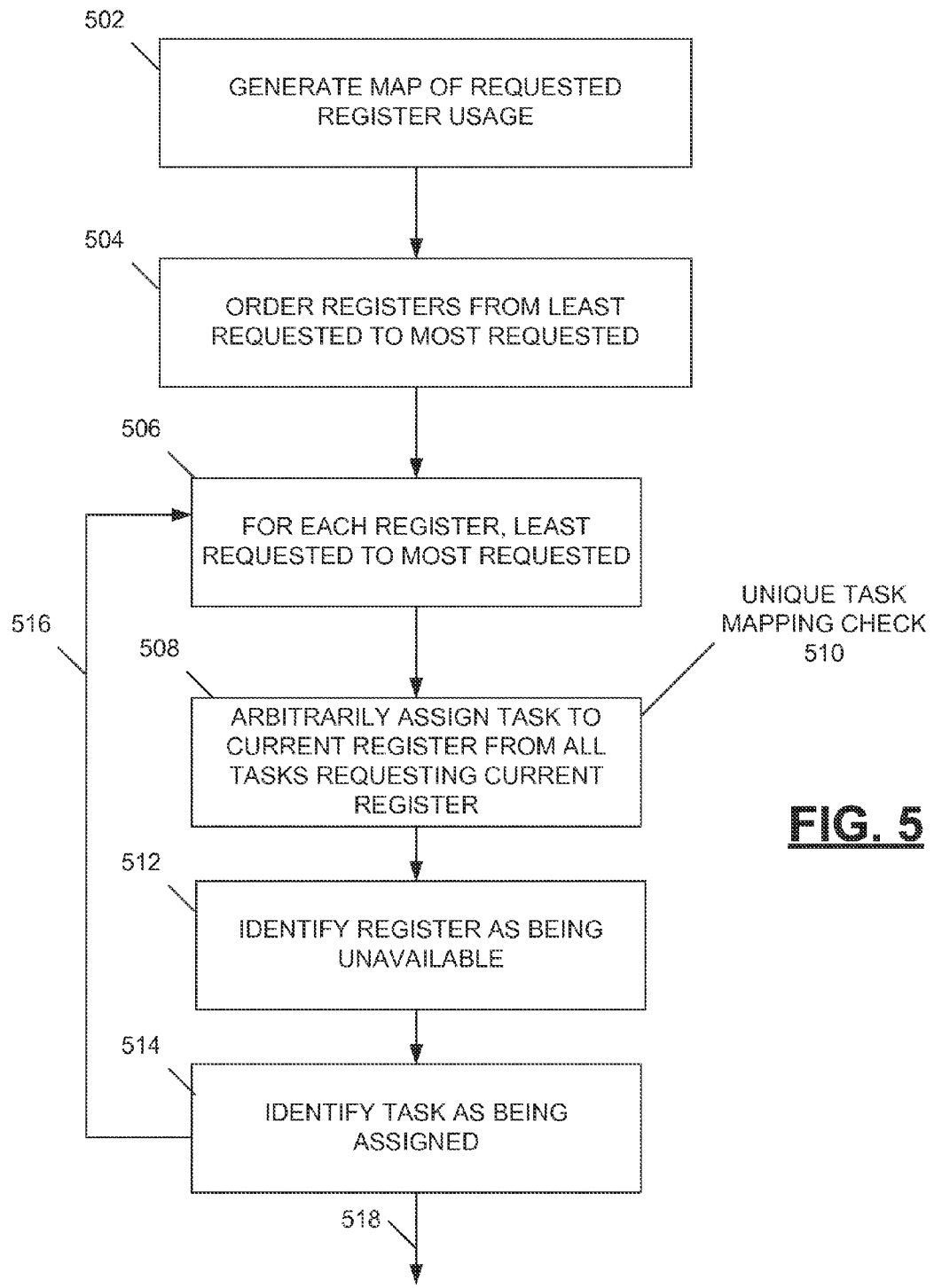
FIG. 5 is a flow diagram depicting a method for performing tasks that may be performed by a system in an embodiment of the disclosure.

FIG. 5 is a flow diagram depicting a method for performing tasks that may be performed by a system in an embodiment of the disclosure. At 502, a map is generated of requested register usage (e.g., desired tasks to registers that are competent to perform those tasks). At 504, the registers are ordered from least requested to most requested. A loop is entered at 506, for each register from least requested to most requested. At 508, a task is arbitrarily assigned to the current register from all tasks requesting the current register. As indicated at 510, such assignment may be subject to a condition, such as a unique task mapping check. At 512, the register is identified as being unavailable, and at 514, the task is identified as being assigned. The loop may be repeated at 516 if additional registers remain in the ordered list. Otherwise processing may be continued at 518 with the registers performing their assigned tasks.

This application uses examples to illustrate the invention. The patentable scope of the invention may include other examples.

What is claimed is:

1. A method of performing tasks in a machine having constrained resources for performing the tasks, comprising:
   generating a map between desired tasks to be performed and resources of the machine that can be used to perform the desired tasks, wherein at least one of the resources is capable of performing a subset of the desired tasks and is not capable of performing all of the desired tasks, the map being stored on one or more computer-readable mediums, and wherein, for each desired task, the map includes a link to each of the resources that can be used to perform the task;

sorting the resources using a data processing unit based on a number of the desired tasks that can be performed by each resource using the map, wherein sorting the resources comprises, determining, for each resource, a count of links from the desired tasks to that resource, and sorting the resources based on the counts;

selecting a first task to be performed by the machine and selecting a first resource of the machine to perform the selected first task based on the sorted order of the resources; and performing, by the machine, the selected first task using the selected first resource.

2. The method of claim 1, wherein selecting includes:
identifying the first resource based on the sorted order;
identifying a subset of the desired tasks that can be performed by the first resource based on the map;
determining that a particular task of the subset tasks can only be performed by the first resource;
selecting the particular task as the first task based on said determining.

3. The method of claim 1, further comprising:
selecting the first resource as the resource having the smallest count;
when the first resource is associated with only one link in the map, selecting the first task as the desired task associated with that one link;
when the first resource is associated with more than one link in the map, selecting the first task from among the desired tasks associated with the more than one links arbitrarily.

4. The method of claim 1, further comprising:
marking one of the links of the map as assigned after selecting the first task and the first resource.

5. The method of claim 1, further comprising:
identifying the selected first resource as unavailable after the selecting of the first resource; and
identifying the first task as being assigned after selecting the first task.

6. The method of claim 1, further comprising:
selecting a second task to be performed by the machine and selecting a second resource of the machine to perform the selected second task based on the sorted order of the resources.

7. The method of claim 6, further comprising:
further selecting tasks and resources to perform those selected tasks until all of the resources have been assigned tasks.

8. The method of claim 1, wherein one or more of the desired tasks include tracking a debugging metric.

9. The method of claim 8, wherein the debugging metric measures at least one of: processor cycles, cache misses, completed instructions, a stall condition count, an access clash count, and a power dissipation.

10. The method of claim 1, wherein the resources of the machine are registers.

11. The method of claim 10, wherein the registers are special registers, wherein each of the special registers is configured to ascertain one of a plurality of debugging metrics.

12. The method of claim 1, wherein the resources include entries in a content-addressable memory, and wherein the tasks include identification of different types of packets.

13. A computer-implemented system that is configured to perform tasks, comprising:

a plurality of resources, wherein each of the resources is configured to perform one or more types of tasks;

one or more computer-readable mediums encoded with:
a task data structure that includes indications of desired tasks to be performed, wherein at least one of the resources is capable of performing a subset of the desired tasks and is not capable of performing all of the desired tasks; and a resource-task map data structure that associates the desired tasks with resources of the plurality of resources that can perform the desired tasks, wherein, for each desired task, the resource-task map data structure includes a link to each of the resources that can be used to perform the task; and a data processing unit configured to:
determine a count of the number of desired tasks associated with each of the resources, wherein the count is determined, for each resource, by counting the number of links from the desired tasks to that resource using the resource-task map data structure; and assign desired tasks to the resources based on the determined counts.

14. The system of claim 13, wherein the data processing unit is configured to:
identify a first resource based on the determined counts;
identify a subset of the desired tasks that can be performed by the first resource based on the map;
determine that a particular task of the subset tasks can only be performed by the first resource; and
assign the particular task to the first resource.

15. The system of claim 13, wherein the data processor is configured to assign desired tasks to the resources by:
selecting a first resource as the resource having the smallest count;
when the first resource is associated with one desired task in the map, selecting the first task as that one desired;
when the first resource is associated with more than one desired task in the map, selecting the first task from among the more than one desired tasks arbitrarily.

16. The system of claim 13, wherein the resources are registers of the data processor.

17. The system of claim 16, wherein the registers are special registers, wherein each of the special registers is configured to measure one of a plurality of debugging metrics.

18. The system of claim 13, wherein one of the plurality of resources is configured to perform a different subset of tasks than another one of the plurality of resources.

* * * * *